US007910248B2

United States Patent
Onodera et al.

(10) Patent No.: US 7,910,248 B2
(45) Date of Patent: Mar. 22, 2011

(54) AROMATIC-POLYETHER-TYPE ION-CONDUCTIVE ULTRAHIGH MOLECULAR WEIGHT POLYMER, INTERMEDIATE THEREFOR, AND PROCESS FOR PRODUCING THESE

(75) Inventors: Toru Onodera, Tsukuba (JP); Shigeru Sasaki, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 920 days.

(21) Appl. No.: 10/554,707

(22) PCT Filed: Apr. 23, 2004

(86) PCT No.: PCT/JP2004/005920
§ 371 (c)(1),
(2), (4) Date: Oct. 27, 2005

(87) PCT Pub. No.: WO2004/096889
PCT Pub. Date: Nov. 11, 2004

(65) Prior Publication Data
US 2006/0258758 A1  Nov. 16, 2006

(30) Foreign Application Priority Data
Apr. 28, 2003 (JP) ................................. 2003-123274

(51) Int. Cl.
*H01M 6/18* (2006.01)
*B01J 41/14* (2006.01)
(52) U.S. Cl. ............. 429/314; 429/317; 521/25; 521/27; 521/33
(58) Field of Classification Search .............. 521/25, 521/27, 33; 429/314, 317
See application file for complete search history.

(56) References Cited

U.S. PATENT DOCUMENTS

| 2002/0188097 | A1* | 12/2002 | Goto et al. ............ 528/397 |
| 2003/0096149 | A1* | 5/2003 | Koyama et al. ......... 429/33 |
| 2003/0180596 | A1* | 9/2003 | Yoshimura et al. ...... 429/33 |

FOREIGN PATENT DOCUMENTS

| EP | 0 932 213 A | 7/1999 |
| EP | 1 245 554 | 10/2002 |
| EP | 1 296 398 A | 3/2003 |
| EP | 1 314 751 A | 5/2003 |
| JP | 10-21943 A | 1/1998 |
| JP | 2001-261818 | 9/2001 |
| JP | 2002-220469 A | 8/2002 |
| JP | 2002-293889 | 10/2002 |
| JP | 2002-305007 A | 10/2002 |
| JP | 2003-100317 A | 4/2003 |
| JP | 2003-238665 A | 8/2003 |
| JP | 2003-331868 A | 11/2003 |
| JP | 2004-285118 | 10/2004 |
| WO | WO 00/24796 A1 * | 5/2000 |
| WO | WO 01/19896 A | 3/2001 |

OTHER PUBLICATIONS

Machine Translation of JP 2003-331868 A.*
T. Yamamoto, "π-Conjugated Polymers Bearing Electronic and Optical Functionalities. Preparation by Organometallic Polycondensations, Properties, and Their Applications", *Bull. Chem. Soc. Jpn.*, vol. 72, 1999, pp. 621-638.
J.M. Lambert et al., "Synthesis of Segmented Poly(Arylene Ether Sulfone)-Poly(Arylene Terephthalate) Copolymers", *Polymer Science and Technology*, vol. 31, 1985, pp. 93-112.

* cited by examiner

*Primary Examiner* — David Wu
*Assistant Examiner* — Vu Nguyen
(74) *Attorney, Agent, or Firm* — Sughrue Mion, PLLC

(57) ABSTRACT

An aromatic-polyether-type ion conductive polymer membrane having improved mechanical strength is provided.

An aromatic-polyether-type ion-conductive ultrahigh molecular weight polymer having an ion exchange capacity of 0.1 meq/g or higher and a structure comprising an aromatic-polyether-type ultrahigh molecular weight polymer in which an acid group introduced, said aromatic-polyether-type ultrahigh molecular weight polymer having at least one structural unit selected from those represented by the following formulas (1) and (2) and the sum of the number a of the structural unit of the formula (1) and the number b of the structural unit of the formula (2) being 2 or larger:

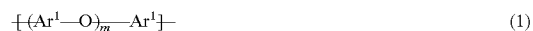

(1)

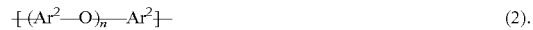

(2).

8 Claims, No Drawings

AROMATIC-POLYETHER-TYPE ION-CONDUCTIVE ULTRAHIGH MOLECULAR WEIGHT POLYMER, INTERMEDIATE THEREFOR, AND PROCESS FOR PRODUCING THESE

TECHNICAL FIELD

The present invention relates to an aromatic-polyether-type ion-conductive ultrahigh molecular weight polymer, an intermediate therefor, a process for producing the same, and uses thereof.

BACKGROUND ART

Polymer electrolytes comprising polymers having ion-conductivity are used as diaphragms of electrochemical devices such as primary batteries, secondary batteries and solid polymer type fuel cells. For example, perfluorosulfonic acid-based materials such as Nafion (trademark of DuPont de Nemours, E.I., Co.) have been mainly used because they are superior in characteristics when used in fuel cells. However, these materials suffer from the problems that they are very expensive, low in heat resistance, and low in film strength, which requires some reinforcement for practical use.

Under such circumstances, development of inexpensive polymers substitutable for the above ion-conductive polymers is now hastened. Among them, those which are promising are polymers comprising an aromatic polyether excellent in heat resistance and high in film strength into which an acid group such as sulfonic acid group is introduced, namely, aromatic polymers having an aromatic main chain to which an acid group such as sulfonic acid group is directly bonded. For example, there are proposed aromatic-polyether-type ion-conductive polymers such as sulfonated polyether ketone type (JP-A-11-502,249) and sulfonated polyether sulfone type (JP-A-10-45,913 (U.S. Pat. No. 6,087,031)), JP-A-10-21,943 (U.S. Pat. No. 5,985,477)).

DISCLOSURE OF INVENTION

The film strength of these aromatic-polyether-type ion-conductive polymers is higher than that of perfluorosulfonic acid-based materials, but is not sufficiently satisfactory when they are used as electrolyte membranes of fuel cells and the like. Thus, development of electrolytes improved in this point has been desired.

As a result of intensive research conducted by the inventors in an attempt to provide aromatic-polyether-type ion-conductive polymers improved in mechanical strength, it has been found that the molecular weight of the aromatic-polyether-type polymers can be further increased by a condensation reaction utilizing the terminal group of the polymers, namely, by coupling aromatic-polyether-type polymers per se which have halogen or the like as a terminal group, whereby aromatic polyethers of ultrahigh molecular weight can be obtained, and it has been further found that ion-conductive ultrahigh molecular weight polymers comprising this aromatic-polyether-type ultrahigh molecular weight polymer in which a sulfonic acid group or the like introduced can be made to electrolyte membranes having excellent film strength. As a result of further various researches, the present invention has been accomplished.

That is, the present invention provides [1] an aromatic-polyether-type ion-conductive ultrahigh molecular weight polymer which has an ion exchange capacity of 0.1 meq/g or higher and has a structure comprising an aromatic-polyether-type ultrahigh molecular weight polymer in which an acid group introduced, said aromatic-polyether-type ultrahigh molecular weight polymer having at least one structural unit selected from the units represented by the following formulas (1) and (2) and the sum of the number a of the structural unit of the formula (1) and the number b of the structural unit of the formula (2) being 2 or larger:

　(1)

　(2)

(wherein $Ar^1$ and $Ar^2$ independently represent an aromatic divalent group, m and n represent a repeating number, m and n independently represent a numeral of 10 or more, and a plurality of $Ar^1$, a plurality of $Ar^2$, a plurality of m and a plurality of n may be different respectively).

The present invention further provides [2] an aromatic-polyether-type ion-conductive ultrahigh molecular weight polymer described in the above [1], wherein the acid group is sulfonic acid group.

Moreover, the present invention provides [3] a process for producing the aromatic-polyether-type ion-conductive ultrahigh molecular weight polymer described in the above [1] which comprises introducing an acid group into an aromatic-polyether-type ultrahigh molecular weight polymer having at least one structural unit selected from the units represented by the formulas (1) and (2) described in the above [1], the sum of the number a of the structural unit of the formula (1) and the number b of the structural unit of the formula (2) being 2 or larger, and [4] a process described in the above [3], wherein the acid group is sulfonic acid group.

Moreover, the present invention provides [5] an aromatic-polyether-type ultrahigh molecular weight polymer having at least one structural unit selected from ones represented by the formulas (1) and (2) described in the above [1], the sum of the number a of the structural unit of the formula (1) and the number b of the structural unit of the formula (2) being 2 or larger.

Furthermore, the present invention provides [6] a process for producing an aromatic-polyether-type ultrahigh molecular weight polymer described in the above [5] which comprises polymerizing by a condensation reaction at least one polymer selected from the polymers represented by the following formulas (3) and (4) in the presence of a zerovalent transition metal complex:

　(3)

　(4)

(wherein $Ar^1$, $Ar^2$, m and n are the same as defined above, X represents a group which is eliminated at the condensation reaction, and a plurality of X may be different), and [7] a process for producing an aromatic-polyether-type ultrahigh molecular weight polymer described in the above [6], wherein X is chlorine, bromine, iodine, p-toluenesulfonyloxy group, methanesulfonyloxy group or trifluoromethanesulfonyloxy group.

Further, the present invention provides [8] a polymer electrolyte comprising the aromatic-polyether-type ion-conductive ultrahigh molecular weight polymer described in the above [1] as an effective component, [9] a polymer electrolyte membrane comprising the polymer electrolyte described in the above [8], [10] a catalyst composition comprising the polymer electrolyte described in the above [8], and [11] a fuel cell using the polymer electrolyte membrane described in the above [9] and/or the catalyst composition described in the above [10].

BEST MODE FOR CARRYING OUT THE INVENTION

The present invention will be explained in detail below.

The ion exchange capacity of the aromatic-polyether-type ion-conductive ultrahigh molecular weight polymer of the present invention is 0.1 meq/g or higher, preferably about 0.1-4 meq/g, more preferably about 0.8-2.5 meq/g. When the aromatic-polyether-type ion-conductive ultrahigh molecular weight polymer is used as a polymer electrolyte for fuel cells, if the ion exchange capacity is too low, proton-conductivity is low and the function as an electrolyte is sometimes insufficient. If it is too high, water resistance may deteriorate, which is not preferred.

Furthermore, the aromatic-polyether-type ion-conductive ultrahigh molecular weight polymer of the present invention has a structure comprising an aromatic-polyether-type ultrahigh molecular weight polymer and an acid group introduced therein, and contains at least one structural unit selected from those represented by the above-mentioned formulas (1) and (2) in which the sum of the number a of the structural unit represented by the formula (1) and the number b of the structural unit represented by the formula (2) is 2 or larger.

For example, when the aromatic-polyether-type ultrahigh molecular weight polymer has only either one of the structural units of the formulas (1) and (2), the polymer has a structure of simple re-extended polymer. When the aromatic-polyether-type ultrahigh molecular weight polymer has both the structural units of the formulas (1) and (2), the polymer of the present invention has a structure of block copolymer. In case the structural unit of the formula (1) constitutes a plurality of blocks in the block copolymer, a plurality of $Ar^1$ and a plurality of m may be different, and the number a of the structural unit may also be different in every block. Similarly, in case the structural unit of the formula (2) constitutes a plurality of blocks, a plurality of $Ar^2$ and a plurality of n may be different, and the number b of the structural unit may also be different in every block.

$Ar^1$ and $Ar^2$ in the formulas (1) and (2) represent independently an aromatic divalent group, and typical examples of the aromatic divalent group are 1,4-phenylene, 1,3-phenylene, 1,2-phenylene, 2-phenyl-1,4-phenylene, 2-phenoxy-1,4-phenylene, 1,4-naphthylene, 2,3-naphthylene, 1,5-naphthylene, 2,6-naphthylene, 2,7-naphthylene, biphenyl-4,4'-diyl, biphenyl-3,3'-diyl, biphenyl-3,4'-diyl, 3,3'-diphenylbiphenyl-4,4'-diyl, 3,3'-diphenoxybiphenyl-4,4'-diyl, 2,2-diphenylpropane-4',4"-diyl, diphenylether-4,4'-diyl, diphenylsulfone-4,4'-diyl, benzophenone-4,4'-diyl, and divalent groups containing an ether linkage as shown below.

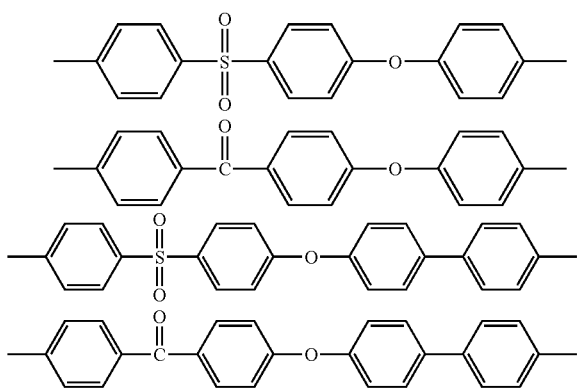

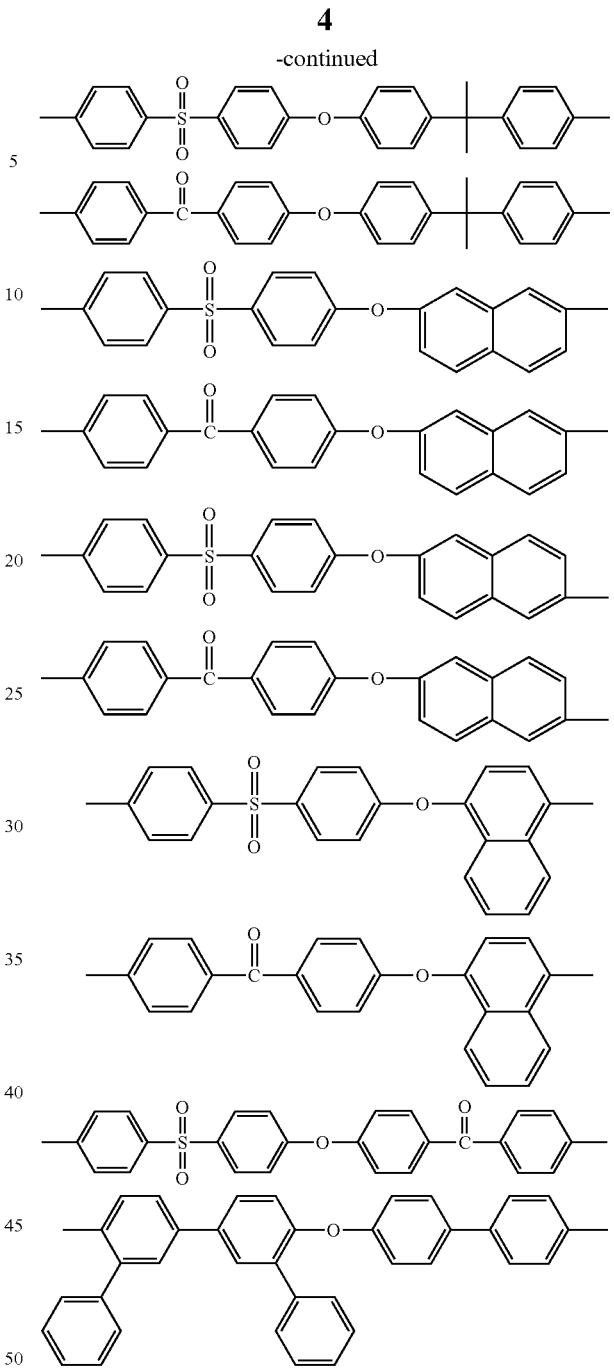

These aromatic divalent groups may have substituents, and the substituents are preferably those which do not hinder the condensation reaction mentioned hereafter, such as, for example, an alkyl of 1-6 carbon atoms, an alkoxy of 1-6 carbon atoms, phenyl, and phenoxy. Especially preferred are methyl, ethyl, methoxy, ethoxy, phenyl and phenoxy. The position of the substituent is not particularly limited and the number of the substituent is also not particularly limited.

As aforementioned, a plurality of the respective $Ar^1$ and $Ar^2$ may be different.

The symbols m and n which indicate the repeating number represent independently a numeral of 10 or more, preferably about 20-250, more preferably about 50-200. A plurality of the respective m and n may be different as aforementioned.

The sum of the number a of the structural unit represented by the formula (1) and the number b of the structural unit represented by the formula (2) is 2 or larger, and preferably about 3-10.

Examples of the acid groups are carboxylic acid group, sulfonic acid group, sulfonylimide group, phosphonic acid group, etc. Sulfonic acid group and sulfonylimide group are preferred when the polymer is used as a polymer electrolyte of fuel cells and the like.

These acid groups may be directly substituted on the aromatic ring constituting the main chain of the polymer or may be introduced into the substituents or side chains of the aromatic ring constituting the main chain, or they may be introduced by using in combination both the above. The number of the acid groups per one aromatic ring is not particularly limited.

The number-average molecular weight in terms of polystyrene is usually about 2,000-100,000, preferably about 5,000-80,000 for the structural units of the formula (1) and the formula (2), respectively, and is usually about 100,000 or more, preferably about 150,000 or more, more preferably about 200,000-400,000 for the aromatic-polyether-type ultrahigh molecular weight polymer.

The aromatic-polyether-type ion-conductive ultrahigh molecular weight polymer of the present invention can have such a structure as comprising the above aromatic-polyether-type ultrahigh molecular weight polymer in which an acid group is introduced, and the process for producing it is not particularly limited. For example, it can be produced by introducing an acid group in the above aromatic-polyether-type ultrahigh molecular weight polymer.

The method for introduction of the acid group can be known one. For example, in the case of introducing a sulfonic acid group in the aromatic ring, there may be employed a method which comprises dispersing or dissolving the aromatic-polyether-type ultrahigh molecular weight polymer in concentrated sulfuric acid and, if necessary, heating or adding fuming sulfuric acid (e.g., JP-A-10-45,913 (U.S. Pat. No. 6,087,031), JP-A-10-21,943 (U.S. Pat. No. 5,985,477), etc.). In the case of introducing a sulfonic acid group through an alkylene group, there may be used a reaction using sultone as disclosed in J. Amer. Chem. Soc., 76, 5357-5360 (1954). Furthermore, in the case of introducing a sulfonic acid group through an alkyleneoxy group, there may be used a method of reacting a monomer or polymer having a hydroxyl group with an alkali metal compound and/or an organic base compound to produce an alkali metal salt and/or an amine salt, followed by carrying out a reaction with an alkylsulfonic acid having an eliminating group.

In the case of introducing a carboxylic acid group, there may be used a method of brominating the aromatic-polyether-type ultrahigh molecular weight polymer by a known method (e.g., JP-A-2002-241,493, Polymer, 1989, Vol. 30, June, 1137-1142, etc.) and thereafter introducing a carboxylic acid group by an action of carbon dioxide using the Grignard reaction, a method of introducing an acyl group or an alkyl group using a known method such as Friedel-Crafts reaction and thereafter converting the acyl group or alkyl group to a carboxylic acid group by a known oxidation reaction, and the like.

In the case of introducing a sulfonylimide group, there may be used a method of converting the sulfonic acid group introduced, for example, by the above method to a sulfonyl halide group such as sulfonyl chloride by the action of thionyl chloride or the like, a method of introducing a sulfonyl chloride group by the action of chlorosulfuric acid into the aromatic-polyether-type ultrahigh molecular weight polymer, if necessary, in an organic solvent and then acting a sulfonylamide compound such as methanesulfonylamide or benzenesulfonylamide, if necessary, in the presence of a deoxidizer to introduce a sulfonylimide group, and other methods.

In the case of introducing a phosphonic acid group, there may be used a method of introducing a bromo group according to a known method, thereafter acting a trialkyl phosphite in the presence of a nickel compound such as nickel chloride to introduce a phosphonic acid diester group, and hydrolyzing it by a known method (e.g., Chem. Ber., 103, 2428-2436 (1970), etc.), a method of forming a C—P linkage by Friedel-Crafts reaction using phosphorus trichloride or phosphorus pentachloride in the presence of a Lewis acid catalyst, and, if necessary, carrying out oxidation and hydrolysis to convert to a phosphonic acid group, a method of acting phosphoric acid anhydride at high temperatures (e.g., J. Amer. Chem. Soc., 76, 1045-1051 (1954), etc.), and other methods.

Next, the process for producing the aromatic-polyether-type ultrahigh molecular weight polymer will be explained.

The aromatic-polyether-type ultrahigh molecular weight polymer can be produced by polymerizing at least one polymer selected from the polymers represented by the following formulas (3) and (4) in the presence of a zerovalent transition metal complex by a condensation reaction:

  (3)

  (4)

(wherein $Ar^1$, $Ar^2$, m and n are the same as defined hereinbefore, X represents a group which is eliminated at the condensation reaction, and a plurality of X may be different).

Here, X represents a group which is eliminated at the time of the condensation reaction. As the specific examples thereof, mention may be made of halogens such as chlorine, bromine and iodine, and sulfonic acid ester groups such as p-toluenesulfonyloxy group, methanesulfonyloxy group and trifluoromethanesulfonyloxy group.

The polymerization by condensation reaction is carried out in the presence of a zerovalent transition metal complex, and examples of the zerovalent transition metal complex are zerovalent nickel complex, zerovalent palladium complex, etc. Among them, the zerovalent nickel complex is preferred.

As the zerovalent transition metal complexes, those which are commercially available or separately synthesized may be used in polymerization reaction system, or may be produced from transition metal compounds by the action of a reducing agent in the polymerization reaction system.

In either case, it is preferred to add a ligand mentioned hereinafter from the point of increase in the yield.

Examples of the zerovalent nickel complexes include bis(cyclooctadiene)nickel (0), (ethylene)bis(triphenylphosphine)nickel (0), tetrakis(triphenylphosphine)nickel (0), etc. Among them, preferred is bis(cyclooctadiene)nickel (0). The zerovalent palladium complexes include, for example, tetrakis(triphenylphosphine)palladium(0), etc.

When a reducing agent is acted on a transition metal compound to produce a zerovalent transition metal complex, the transition metal compound used is usually a divalent transition metal compound, but a zerovalent transition metal compound may also be used. Among them, divalent nickel compounds and divalent palladium compounds are preferred. The divalent nickel compounds include, for example, nickel chloride, nickel bromide, nickel iodide, nickel acetate, nickel acetylacetonate, bis(triphenylphosphine)nickel chloride, bis(triphenylphosphine)nickel bromide, and bis(triphenylphosphine)nickel iodide, etc. and the divalent palladium compounds include, for example, palladium chloride, palladium bromide, palladium iodide, palladium acetate, etc.

As the reducing agent, there may be used metals such as zinc and magnesium, and alloys thereof with, for example, copper, sodium hydride, hydrazine and derivatives thereof, lithium aluminum hydride, etc. Preferred are zinc and magnesium. If necessary, in combination with these reducing agents, there may be used ammonium iodide, trimethylammonium iodide, triethylammonium iodide, lithium iodide, sodium iodide, potassium iodide, etc.

The amount of the zerovalent transition metal complex is usually 0.1-5 times in mol with respect to the total amount of the polymers represented by the formula (3) and the formula (4). If the amount is too small, the molecular weight tends to decrease, and hence the amount is preferably 1.5 times or more, more preferably 1.8 times or more, further preferably 2.1 times or more. As for the upper limit of the amount, it is desirably 5.0 times or less in mol since if the amount is too large, the after-treatment tends to become complicated.

When the reducing agent and the transition metal compound are used, the amount of the transition metal compound is 0.01-1 time in mol with respect to the total amount of the polymers represented by the formula (3) and the formula (4). If the amount is too small, the molecular weight tends to decrease, and hence the amount is preferably 0.03 time or more in mol. As for the upper limit of the amount, it is desirably 1.0 time or less in mol since if the amount is too large, the after-treatment tends to become complicated.

The amount of the reducing agent is 0.5-10 times in mol with respect to the total amount of the polymers represented by the formula (3) and the formula (4). If the amount is too small, the molecular weight tends to decrease, and hence the amount is preferably 1.0 time or more in mol. As for the upper limit of the amount, it is desirably 10 times or less in mol since if the amount is too large, the after-treatment tends to become complicated.

The ligands mentioned above include, for example, 2,2'-bipyridyl, 1,10-phenanthroline, methylenebisoxazoline, N,N,N',N'-tetramethylethylenediamine, triphenylphosphine, tritolylphosphine, tributylphosphine, triphenoxyphosphine, 1,2-bisdiphenylphosphinoethane, 1,3-bisdiphenylphosphinopropane, etc., and triphenylphosphine and 2,2'-bipyridyl are preferred from the viewpoints of general-purpose properties, cheapness, high reactivity and high yield. Particularly, when 2,2'-bipyridyl is used in combination with bis(1,5-cyclooctadiene)nickel (0), yield of the polymer is improved, and hence this combination is preferably used.

In case the ligand is allowed to coexist, ordinarily this is used in a molar ratio of about 0.2-2, preferably about 1-1.5 (on the basis of metal atom) with respect to the zerovalent transition metal complex.

The condensation reaction is usually carried out in the presence of a solvent. Examples of the solvent are aromatic hydrocarbon solvents such as benzene, toluene, xylene, n-butylbenzene, mesitylene and naphthalene; ether solvents such as diisopropyl ether, tetrahydrofuran, 1,4-dioxane and diphenyl ether; non-protonic polar solvents, representatives of which are amide solvents such as N,N-dimethylformamide, N,N-dimethylacetamide, N-methylpyrrolidone, hexamethylphosphoric triamide and dimethylsulfoxide; aliphatic hydrocarbon solvents such as tetralin and decalin; ether solvents such as tetrahydrofuran, 1,4-dioxane, dibutyl ether, tert-butylmethyl ether and dimethoxyethane; ester solvents such as ethyl acetate, butyl acetate and methyl benzoate; halogenated alkyl solvents such as chloroform and dichloroethane; and the like.

In order to further increase the molecular weight of the resulting ultrahigh molecular weight polymers, it is desired that polymer and ultrahigh molecular weight polymer are sufficiently dissolved, and therefore the solvents are preferably tetrahydrofuran, 1,4-dioxane, N,N-dimethylformamide, N,N-dimethylacetamide, dimethylsulfoxide, toluene, etc. which are good solvents for polymers and ultrahigh molecular weight polymers. These may be used in admixture of two or more. Among them, tetrahydrofuran, N,N-dimethylformamide, N,N-dimethylacetamide, and mixtures of two or more of them are preferred.

The solvents are used in an amount of usually about 5-500 times in weight, preferably about 20-100 times in weight with respect to the polymers represented by the formula (3) and/or the formula (4).

The condensation temperature is usually about 0-250° C., preferably about 10-100° C., and the condensation time is usually about 0.5-24 hours. In order to further increase the molecular weight of the resulting ultrahigh molecular weight polymers, it is preferred to allow the zerovalent transition metal complex to act on the polymers represented by the formula (3) and/or the formula (4) at a temperature of 45° C. or higher. The preferred acting temperature is usually 45-200° C., especially preferably about 50-100° C.

The method of allowing the zerovalent transition metal complex to act on the polymers represented by the formula (3) and/or the formula (4) may be a method of adding one of them to another or a method of simultaneously adding them into a reaction vessel. They may be added at once, but it is preferred to add them little by little considering generation of heat or in the presence of a solvent.

After allowing the zerovalent transition metal complex to act on the polymers represented by the formula (3) and/or the formula (4), they are kept usually at about 45-200° C., preferably at about 50-100° C.

The resulting aromatic-polyether-type ultrahigh molecular weight polymer is a simple re-extended polymer represented by, for example, the formula (3) as mentioned above when $Ar^1$ and $Ar^2$ in the formulas (3) and (4) are the same and is a block copolymer of a polymer represented by the formula (3) and a polymer represented by the formula (4) when they are different.

Usually, in a process for producing a condensation type block copolymer, in order to adjust the compositional ratio of each block, it is necessary to control the molecular weight of each block precursor polymer and accurately adjust the equivalent of the reactive terminal group, while according to the present invention, a block copolymer of preferred composition can be synthesized only by controlling the charging weight ratio.

The aromatic-polyether-type ultrahigh molecular weight polymer produced by the condensation reaction can be separated from the reaction mixture by a conventional method. For example, a poor solvent is added to precipitate the polymer, and the desired product can be separated by filtration or the like. Furthermore, if necessary, it can be purified by usual purification method such as washing with water or re-precipitation using good solvent and poor solvent.

The polymerization degree of the aromatic-polyether-type ultrahigh molecular weight polymer and analysis of the polymer structure can be carried out by usual means such as GPC measurement and NMR measurement.

Thus, the aromatic-polyether-type ultrahigh molecular weight polymer is obtained. The polymerization degree of the polymer is shown by (m×a+n×b), and according to the present invention, there can be produced polymers having very high molecular weight, for example, those having a polymerization degree of 500 or more, which cannot be produced by the conventional processes.

The number-average molecular weight in terms of polystyrene is usually about 100,000 or more, preferably about 150,000 or more, more preferably about 200,000-400,000.

Next, explanation will be made of the case where the aromatic-polyether-type ion-conductive ultrahigh molecular weight polymer of the present invention is used as a diaphragm of electrochemical devices such as fuel cells.

In this case, the polymer is used ordinarily in the form of a film, and the method of converting the polymer to a film is not particularly limited, and, for example, a method of forming a film from the polymer in the state of solution (solution casting method) is preferred.

Specifically, a copolymer is dissolved in a suitable solvent and the solution is cast coated on a support such as a glass plate, followed by removing the solvent to form a film. The solvent used for the film formation is not particularly limited so long as it can dissolve the copolymer and can be removed later. There may be suitably used, for example, non-protonic polar solvents such as N,N-dimethylformamide, N,N-dimethylacetamide, N-methyl-2-pyrrolidone and dimethylsulfoxide; chlorine-based solvents such as dichloromethane, chloroform, 1,2-dichloroethane, chlorobenzene and dichlorobenzene; alcohols such as methanol, ethanol and propanol; and alkylene glycol monoalkyl ethers such as ethylene glycol monomethyl ether, ethylene glycol monoethyl ether, propylene glycol monomethyl ether and propylene glycol monoethyl ether. If necessary, these may be used in admixture of two or more. Of these solvents, dimethyl sulfoxide, N, N-dimethylformamide, N, N-dimethylacetamide, N-methylpyrrolidone, etc. are preferred because solubility of the polymer in these solvents is high.

The thickness of the film is not particularly limited, and is preferably 10-300 μm, more preferably 15-100 mμ. If the thickness is less than 10 μm, the film may not have sufficient practical strength, and if it is more than 300 μm, the film is high in membrane resistance, which tends to deteriorate the characteristics of electrochemical devices. The film thickness can be controlled by the concentration of solution and the coating thickness on the support.

Furthermore, for the purpose of improving various physical properties of the film, plasticizers, stabilizers, releasing agents, etc. which are used in the field of polymers can be added to the aromatic-polyether-type ion-conductive ultrahigh molecular weight polymer of the present invention. Moreover, it is possible to compositely alloy the copolymer of the present invention with other polymers by a method of mixing in the same solvent and co-casting the mixture.

In the use for fuel cells, it is known to add an inorganic or organic fine particles as a water retaining agent for attaining easy water control. All of these known methods can be used so long as attainment of the object of the present invention is not hindered.

Moreover, for the purpose of improving mechanical strength of the film, the polymer can be crosslinked by irradiation with electron rays or radioactive rays. Furthermore, there is known a method of impregnating a porous film or sheet with the polymer to make a composite film or sheet or a method of reinforcing the film by mixing with a fiber or pulp, and all of these known methods can be used so long as attainment of the object of the present invention is not hindered.

Next, the fuel cell of the present invention will be explained.

The fuel cell of the present invention can be produced by bonding a catalyst and an electrically conductive material as a collector to both sides of a film comprising the aromatic-polyether-type ion-conductive ultrahigh molecular weight polymer. Furthermore, the aromatic-polyether-type ion-conductive ultrahigh molecular weight polymer of the present invention can also be used as an ion-conducting component of the catalyst layer. That is, the aromatic-polyether-type ion-conductive ultrahigh molecular weight polymer of the present invention can be used as the electrolyte membrane of a polymer electrolyte membrane-electrode assembly used in fuel cells and as the ion-conducting component of the catalyst layer. A polymer electrolyte membrane-electrode assembly can also be obtained by using the ultrahigh molecular weight polymer as both the electrolyte membrane and the ion-conducting component.

The catalyst is not particularly limited so long as it can activate the oxidation-reduction reaction with hydrogen or oxygen, and known catalysts can be used, and it is preferred to use fine particles of platinum or a platinum alloy. The fine particles of platinum supported on particulate or fibrous carbon such as active carbon or graphite are preferably used.

For the electrically conductive materials as collectors, known materials can also be used, and porous carbon woven fabrics, carbon nonwoven fabrics or carbon papers are preferred since they efficiently transport a raw material gas to the catalyst.

The method for bonding platinum fine particles or platinum fine particles-supporting carbon to the porous carbon nonwoven fabric or carbon paper and the method for bonding them to the polymer electrolyte film are disclosed, for example, in J. Electrochem. Soc.: Electrochemical Science and Technology, 1988, 135(9), 2209, and these known methods can be used.

Thus produced fuel cell of the present invention can be used in various forms which use hydrogen gas, modified hydrogen gas or methanol.

EXAMPLES

The present invention will be explained in detail by the following examples, which should not be construed as limiting the invention in any manner.

The molecular weight in the examples is a number-average molecular weight (Mn) and a weight-average molecular weight (Mw) in terms of polystyrene measured by GPC. The ion exchange capacity is measured by a titration method.

Mechanical properties of the film are measured by the following methods.

The aromatic-polyether-type ion-conductive ultrahigh molecular weight polymer or the like is dissolved in DMAc and the concentration is adjusted to 10 wt %. Then, the solution is cast-coated on a glass support and the solvent is removed to prepare a film. Then, a test piece is punched out from the film by dumbbell cutter-1223 manufactured by Dumbbell Co., Ltd., and elongation is measured at room temperature and 50% RH and at a testing rate of 10 mm/min.

Example 1

<Production of Aromatic-Polyether-Type Ultrahigh Molecular Weight Polymer a-1>

In argon atmosphere, 20 g of the following polyether sulfone copolymer (the suffixes 0.85 and 0.15 at the repeating units of the random copolymer show mol %):

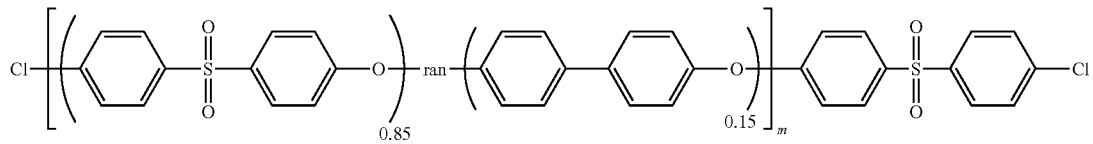

(having Mn=5.50×10⁴ and prepared in accordance with the process disclosed in Example 3 of JP-A-10-21,943 (Example 3 of U.S. Pat. No. 5,985,477)) and 0.468 g (3.00 mmol) of 2,2'-bipyridyl were dissolved in 800 mL of DMAc, the solution was subjected to bubbling with argon for 30 minutes with argon gas, and 0.824 g (3.00 mmol) of Ni(COD)$_2$ was added thereto, followed by heating to 80° C., stirring with keeping at that temperature for 8 hours, and then leaving for cooling. Then, the reaction mixture was poured into 500 mL of 4N hydrochloric acid and the resulting white precipitate was filtered off and purified by re-precipitation according to a usual method to obtain the following aromatic-polyether-type ultrahigh molecular weight polymer a-1. The ultrahigh molecular weight polymer was quantitatively recovered. The molecular weight of the resulting ultrahigh molecular weight polymer was measured to obtain Mn=2.20×10⁵, Mw=3.93×10⁵ (GPC, polystyrene standard). The ultrahigh molecular weight polymer was a polymer which was extended about fourfold.

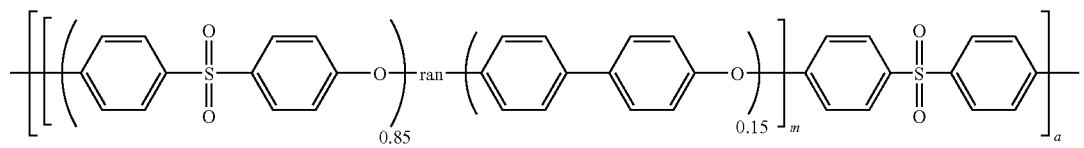

Example 2

<Production of Aromatic-Polyether-Type Ion-Conductive Ultrahigh Molecular Weight Polymer b-1>

10 g of the above aromatic-polyether-type ultrahigh molecular weight polymer a-1 was dissolved in 80 g of concentrated sulfuric acid, and sulfonated at room temperature for 48 hours, followed by purification by a conventional method to obtain an aromatic-polyether-type ion-conductive ultrahigh molecular weight polymer b-1 shown below. The resulting polymer had an ion exchange capacity of 1.15 meq/g. Furthermore, it had an elongation of 25%.

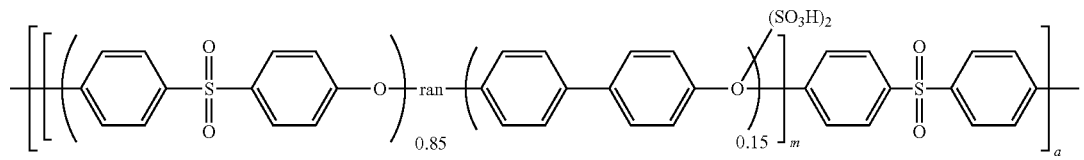

Comparative Example 1

<Production of Aromatic-Polyether-Type Ion-Conductive Ultrahigh Molecular Weight Polymer b'-1>

An aromatic-polyether-type ion-conductive ultrahigh molecular weight polymer b'-1 as shown below was obtained by carrying out the sulfonation and purification in the same manner as in Example 2, except that 5 g of the same polyether sulfone copolymer as used in Example 1 was used in place of the aromatic-polyether-type ultrahigh molecular weight polymer 1. The resulting polymer had an ion exchange capacity of 1.10 meq/g. Furthermore, it had an elongation of 7%.

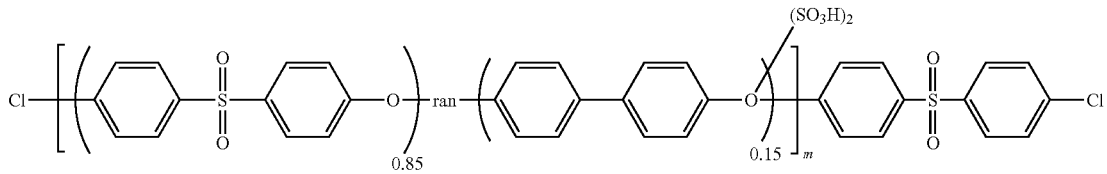

Example 3

Production of Aromatic-Polyether-Type Ultrahigh Molecular Weight Polymer a-2

In argon atmosphere, 2.5 g of the following polyether sulfone of chloro-terminated type:

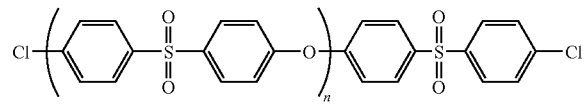

(SUMIKA EXCELL PES 5200P manufactured by Sumitomo Chemical Co., Ltd. and having Mn=5.44×10$^4$ and Mw=1.23×10$^5$: GPC, polystyrene standard), 2.50 g of the following polyether sulfone copolymer:

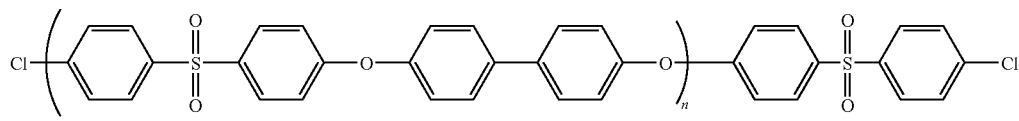

(prepared in accordance with the process disclosed in Example 1 of JP-A-2002-220,469 and having Mn=3.16×10$^4$ and Mw=8.68×10$^4$) and 0.117 g (0.75 mmol) of 2,2'-bipyridyl were dissolved in 200 mL of DMAc, the solution was subjected to bubbling with argon gas for 30 minutes with argon, and 0.206 g (0.75 mmol) of Ni(COD)$_2$ was added thereto, followed by heating to 80° C., stirring with keeping at that temperature for 6 hours, and then leaving for cooling. Then, the reaction mixture was poured into 500 mL of 4N hydrochloric acid and the resulting white precipitate was filtered off and purified by re-precipitation according to a usual method to obtain the following aromatic-polyether-type ultrahigh molecular weight polymer a-2.

The molecular weight of the resulting ultrahigh molecular weight polymer was Mn=1.89×10$^6$, Mw=2.17×10$^6$ (GPC, polystyrene standard).

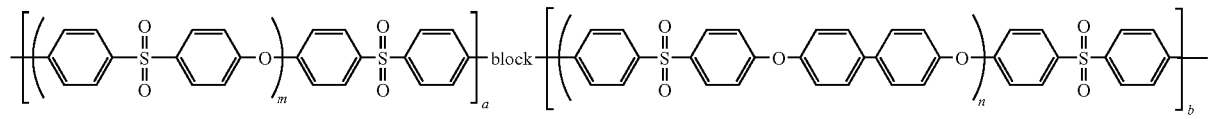

Example 4

<Production of Aromatic-Polyether-Type Ion-Conductive Ultrahigh Molecular Weight Polymer b-2>

An aromatic-polyether-type ion-conductive ultrahigh molecular weight polymer b-2 as shown below was obtained by carrying out the sulfonation and purification in the same manner as in Example 2, except that 5 g of the aromatic-polyether-type ultrahigh molecular weight polymer a-2 was used. The resulting polymer had an ion exchange capacity of 1.77 meq/g.

Example 5

<Production of Aromatic-Polyether-Type Ultrahigh Molecular Weight Polymer a-3>

In argon atmosphere, 5 g of the same polyether sulfone of chloro-terminated type as used in Example 3 (SUMIKA EXCELL PES 5200P manufactured by Sumitomo Chemical Co., Ltd.), 0.172 g (1.10 mmol) of 2,2'-bipyridyl and 15 ml of toluene were dissolved in 100 mL of DMSO, and water in the system was removed by distilling off toluene by heating at a bath temperature of 150° C. After leaving for cooling, 0.382 g (1.39 mmol) of Ni(COD)$_2$ was added thereto, followed by stirring with keeping at 60° C. for 3 hours and at 80° C. for 4 hours, and then leaving for cooling. The reaction mixture was poured into water, and the precipitate was washed with 10% hydrochloric acid and subsequently with water, and then dried.

The molecular weight of the resulting aromatic-polyether-type ultrahigh molecular weight polymer a-3 was measured to obtain Mn=1.40×10$^5$, Mw=3.33×10$^5$ (GPC, polystyrene standard). The ultrahigh molecular weight polymer was a polymer which was extended about threefold.

Example 6

<Production of Aromatic-Polyether-Type Ultrahigh Molecular Weight Polymer a-4>

In argon atmosphere, 5 g of a copolymer (Mn=5.50×10$^4$) represented by the same formula as of the polyether sulfone copolymer used in Example 1 and 0.117 g (0.75 mmol) of 2,2'-bipyridyl were dissolved in 200 mL of DMAc, the solution was subjected to bubbling with argon gas for 30 minutes. Then, the solution was heated to 80° C., and 0.206 g (0.75 mmol) of Ni(COD)$_2$ was added thereto, followed by stirring with keeping at that temperature for 8 hours, and then leaving for cooling. Then, the reaction mixture was poured into 500 mL of 4N hydrochloric acid and the resulting white precipitate was filtered off and purified by re-precipitation according to a usual method to obtain an aromatic-polyether-type ultrahigh molecular weight polymer a-4 represented by the same formula as of the product in Example 1. The ultrahigh molecular weight polymer was quantitatively recovered. The molecular weight of the resulting ultrahigh molecular weight polymer was measured to obtain Mn=3.02×10$^5$, Mw=9.91×

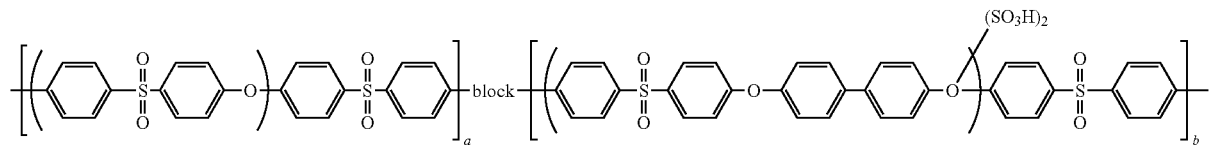

$10^6$ (GPC, polystyrene standard). The ultrahigh molecular weight polymer was a polymer which was extended about 5.5 times.

Example 7

<Production of Aromatic-Polyether-Type Ion-Conductive Ultrahigh Molecular Weight Polymer b-3>

5 g of the above aromatic-polyether-type ultrahigh molecular weight polymer a-4 was dissolved in 40 g of concentrated sulfuric acid and sulfonated at room temperature for 48 hours, and the product was purified by a usual method to obtain an aromatic-polyether-type ion-conductive ultrahigh molecular weight polymer b-3 represented by the same formula as of the product in Example 2. The resulting polymer had an ion exchange capacity of 1.18 meq/g. Furthermore, it had an elongation of 60%.

INDUSTRIAL APPLICABILITY

According to the present invention, the molecular weight of an aromatic polyether can be further increased by a condensation reaction utilizing the terminal group of the polymer, namely, by coupling aromatic-polyether-type polymers per se which have halogen or the like as a terminal group, and an aromatic polyether of ultrahigh molecular weight can be easily produced.

Furthermore, an aromatic-polyether-type ion-conductive ultrahigh molecular weight polymer obtained by introducing an acid group such as sulfonic acid group into the above aromatic-polyether-type ultrahigh molecular weight polymer can be made to an electrolyte membrane having excellent mechanical strength.

The invention claimed is:

1. An aromatic-polyether-type ion-conductive ultrahigh molecular weight polymer having an ion exchange capacity of 0.1 meq/g or higher and a structure comprising an aromatic-polyether-type ultrahigh molecular weight polymer in which an acid group is introduced, said aromatic-polyether-type ultrahigh molecular weight polymer consisting essentially of at least one structural unit selected from those represented by the following formulas (1) and (2) and the sum of the number a of the structural unit of the formula (1) and the number b of the structural unit of the formula (2) being 2 or larger:

wherein $Ar^1$ and $Ar^2$ independently represent an aromatic divalent group, m and n represent repeating numbers, m and n independently represent a numeral of 10 or more, and a plurality of $Ar^1$, a plurality of $Ar^2$, a plurality of m and a plurality of n may be different respectively; and wherein the aromatic-polyether-type ultrahigh molecular weight polymer has a number-average molecular weight in terms of polystyrene of 100,000 or more.

2. The aromatic-polyether-type ion-conductive ultrahigh molecular weight polymer according to claim 1, wherein the acid group is sulfonic acid group.

3. A process for producing the aromatic-polyether-type ion-conductive ultrahigh molecular weight polymer of claim 1 which comprises introducing an acid group into an aromatic-polyether-type ultrahigh molecular weight polymer consisting essentially of at least one structural unit selected from those represented by the formulas (1) and (2) described in claim 1, the sum of the number a of the structural unit of the formula (1) and the number b of the structural unit of the formula (2) being 2 or larger.

4. A process according to claim 3, wherein the acid group is sulfonic acid group.

5. A polymer electrolyte comprising the aromatic-polyether-type ion-conductive ultrahigh molecular weight polymer of claim 1.

6. A polymer electrolyte membrane comprising the polymer electrolyte of claim 5.

7. A catalyst composition comprising the polymer electrolyte of claim 5.

8. A fuel cell comprising a polymer electrolyte membrane comprising the polymer electrolyte of claim 5 and/or a catalyst composition comprising the polymer electrolyte of claim 5.

* * * * *